(12) United States Patent
Rumbaugh

(10) Patent No.: US 8,609,761 B1
(45) Date of Patent: Dec. 17, 2013

(54) MODIFIED ACRYLIC POLYMER COATING AND METHOD

(75) Inventor: Robert W. Rumbaugh, Pinellas Park, FL (US)

(73) Assignee: Acrylall, LLC, Pinellas Park, FL (US)

( * ) Notice: Subject to any disclaimer, the term of this patent is extended or adjusted under 35 U.S.C. 154(b) by 0 days.

(21) Appl. No.: 13/317,320

(22) Filed: Oct. 14, 2011

(51) Int. Cl.
*A61K 9/16* (2006.01)

(52) U.S. Cl.
USPC .......................................... 524/543

(58) Field of Classification Search
USPC .......................................... 524/543
See application file for complete search history.

(56) References Cited

U.S. PATENT DOCUMENTS

| 2003/0211346 | A1* | 11/2003 | Kausch | 428/483 |
| 2006/0178453 | A1* | 8/2006 | Bohler | 523/218 |
| 2011/0311801 | A1* | 12/2011 | Wheeler et al. | 428/313.5 |
| 2011/0318594 | A1* | 12/2011 | Wheeler et al. | 428/522 |
| 2011/0319542 | A1* | 12/2011 | Bohler et al. | 524/417 |

* cited by examiner

*Primary Examiner* — Peter F Godenschwager
*Assistant Examiner* — Angela C Scott

(57) ABSTRACT

The coating includes components water, styrene acrylic polymer, refined white dolomite, processed granite, calcium sulfate, silicon concentrate 10 percent, titanium dioxide, triton x-100, butoxyethanol and light mineral spirits. Also included is the method of mixing and preparing the coating.

2 Claims, No Drawings

MODIFIED ACRYLIC POLYMER COATING AND METHOD

BACKGROUND OF THE INVENTION

1. Field of the Invention

The present invention relates to a modified acrylic polymer coating and method and more particularly pertains to preparing and utilizing a modified acrylic polymer coating with superior characteristics in the construction industry.

2. Description of the Prior Art

The use of construction coatings is known in the prior art. More specifically, construction coatings previously devised and utilized for the purpose of coating construction surfaces are known to consist basically of familiar, expected, and obvious structural configurations, notwithstanding the myriad of designs encompassed by the crowded prior art which has been developed for the fulfillment of countless objectives and requirements.

While these coatings fulfill their respective, particular objectives and requirements, the prior patents do not describe modified acrylic polymer coatings and methods that create surfaces with superior construction characteristics.

In this respect, the modified acrylic polymer coating and method according to the present invention substantially departs from the conventional concepts and designs of the prior art, and in doing so provides an apparatus primarily developed for the purpose of creating surfaces with superior construction characteristics.

Therefore, it can be appreciated that there exists a continuing need for a new and improved modified acrylic polymer coating and method which can be used for creating surfaces with superior construction characteristics. In this regard, the present invention substantially fulfills this need.

SUMMARY OF THE INVENTION

In view of the disadvantages inherent in the known types of construction coatings now present in the prior art, the present invention provides an improved modified acrylic polymer coating and method. As such, the general purpose of the present invention, which will be described subsequently in greater detail, is to provide a new and improved modified acrylic polymer coating and method which has all the advantages of the prior art and none of the disadvantages.

To attain this, the present invention, the modified acrylic polymer coating and method, is comprised of a plurality of components mixed in accordance with the present invention, the coating includes components as follows: water, 75 gallons; styrene acrylic polymer, 960 lb; refined white dolomite #0, 300 lb; processed granite #70, 600 lb; processed white marble #90, 300 lb; calcium sulfate, 2280 lb; silicon concentrate 10 percent, 17.5 lb; titanium dioxide, 100 lb; triton x-100, 52 lb; butoxyethanol, 52 lb and light mineral spirits, 52 lb.

The modified acrylic polymer aggregate exterior coating as described above is mixed and prepared in accordance with the method steps as follows: heat water to 70 degrees celsius; add calcium sulfate at low speed; add half the dolomite at low speed; heat acrylic and silicon to 135 degrees; add mineral spirits at high speed; add titanium dioxide at high speed; add half the marble and granite; heat or cool the components to 50 degrees celsius; add half the dolomite at high speed; add butoxyethanol at high speed; add half the triton x-100 at high speed; add half the heated acrylic mix; blend the components at high speed until cooled; add half the triton x-100 at high speed; add half the acrylic mix when cooled to 80 degrees and add half the marble and granite at medium speed whereby 5186 lb or 350 gallons of modified acrylic polymer aggregate exterior coating created in accordance with the present invention.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining a plurality of embodiments of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved modified acrylic polymer coating and method which has all of the advantages of the prior art coating materials and none of the disadvantages.

It is another object of the present invention to provide a new and improved modified acrylic polymer coating which may be easily and efficiently manufactured and marketed.

It is further object of the present invention to provide a new and improved modified acrylic polymer coating which is of durable and reliable constructions.

An even further object of the present invention is to provide a new and improved modified acrylic polymer coating which is susceptible of a low cost of manufacture with regard to both materials and labor, and which accordingly is then susceptible of low prices of sale, thereby making such modified acrylic polymer coating and method economically available.

Even still another object of the present invention is to provide a modified acrylic polymer coating and method for creating surfaces with superior construction characteristics.

In addition, it is an object of the present invention to provide a new and improved modified acrylic polymer coating mixed and prepared including water, styrene acrylic polymer, refined white dolomite, processed granite, calcium sulfate, silicon concentrate 10 percent, titanium dioxide, triton x-100, butoxyethanol and light mineral spirits.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying descriptive matter in which there is illustrated preferred embodiments of the invention.

DESCRIPTION OF THE PREFERRED EMBODIMENT

The present invention, the modified acrylic polymer aggregate exterior coating and method, is comprised of a plurality of components mixed and prepared in accordance with the present invention, the primary embodiment of the coating includes components as follows:

| | | |
|---|---|---|
| water | 75 gallons | |
| styrene acrylic polymer | | 960 lb; |
| refined white dolomite #0 | | 300 lb; |
| processed granite #70 | | 600 lb; |
| processed white marble #90 | | 300 lb; |
| calcium sulfate | | 2280 lb; |
| silicon concentrate 10 percent | | 17.5 lb; |
| titanium dioxide | | 100 lb; |
| triton x-100 | | 52 lb; |
| butoxyethanol | | 52 lb and |
| light mineral spirits | | 52 lb. |

The modified acrylic polymer aggregate exterior coating as described above is mixed and prepared in accordance with the method steps as follows:
heat water to 70 degrees celsius;
add calcium sulfate at low speed;
add half the dolomite at low speed;
heat acrylic and silicon to 135 degrees;
add mineral spirits at high speed;
add titanium dioxide at high speed;
add half the marble and granite;
heat or cool the components to 50 degrees celsius;
add half the dolomite at high speed;
add butoxyethanol at high speed;
add half the triton x-100 at high speed;
add half the heated acrylic mix;
blend the components at high speed until cooled;
add half the triton x-100 at high speed;
add half the acrylic mix when cooled to 80 degrees and
add half the marble and granite at medium speed whereby 5186 lb or 350 gallons of modified acrylic polymer aggregate exterior coating created in accordance with the present invention.

An alternate embodiment of the invention includes a modified acrylic polymer interior texture coating mixed and prepared in accordance with the present invention includes components added as follows:

| | | |
|---|---|---|
| water | 75 gallons | 562 lb; |
| styrene acrylic polymer | 16 bags at 60 lb each | 960 lb; |
| refined white dolomite #260 | 16 bags at 60 lb each | 600 lb; |
| processed granite #210 | 10 bags at 60 lb each | 600 lb; |
| calcium sulfate | 38 bags at 60 lb each | 2280 lb; |
| titanium dioxide | 2 bags at 50 lb each | 100 lb; |
| silicon concentrate 10 percent | 17.5 lb | 17.5 lb; |
| triton x-100 | 52 lb | 52 lb; |
| butoxyethanol | 52 lb | 52 lb and |
| light mineral spirits | 52 lb | 52 lb. |

The modified acrylic polymer interior texture coating as described above is mixed and prepared in accordance with the method steps as follows:
heat water to 70 degrees celsius;
add calcium sulfate at low speed;
add half the dolomite at low speed;
heat acrylic and silicon to 135 degrees;
add mineral spirits at high speed;
add titanium dioxide at high speed;
add half the granite;
heat or cool the components to 50 degrees celsius;
add half the dolomite at high speed;
add butoxyethanol at high speed;
add half the triton x-100 at high speed;
add half the heated acrylic mix;
blend the components at high speed until cooled;
add half the triton x-100 at high speed;
add half the acrylic mix when cooled to 80 degrees and
add half the granite at medium speed whereby 5275 lb or 400 gallons of modified acrylic polymer interior texture coating created in accordance with the present invention.

A final alternate embodiment of the invention includes an acrylic modified polymer base coat with components mixed and prepared in accordance with the instructions as follows:

| Item | Component | Kgs | Qty Gal/Lbs | |
|---|---|---|---|---|
| | Add items #1 and #2 and mix at low speed for 2 minutes | | | |
| #1 | Water | | 45.88 Gal | |
| #2 | KTTP | 1.02 Kg | | balances alkalinity |
| | Add items #3 thru #6 mixing at low speed | | | |
| #3 | Acronal 296D | 9.64 Kg | | styrenated acrylic polymer softer |
| #4 | Acronal NS567 | 63.37 Kg | | styrenated acrylic polymer harder |
| #5 | Texanol | 1.48 Kg | | |
| #6 | Propylene Glycol | 1.81 Kg | | |
| | Add item #7 slowly to vortex being careful not to get it on the sides of the mixing tank to avoid balling. Mix for 10 minutes | | | |
| #7 | Bentonite - WH | 2.16 Kg | | Clay agent |
| | Add items #8 and #9 mixing at high speed for 20 minutes | | | |
| #8 | CR 828 | 18.51 Kg | | Titanium color agent |
| #9 | Microna 7 | 55.13 Kg | | Extender- Very white 7 micron |
| | Slow mixer to medium speed. Add items #10 thru #13 Pay extra attention that #13 is exact weight | | | |
| #10 | Colloid 640 | 0.20 Kg | | Defoamer |
| #11 | Nuosept 95 | 1.00 Kg | | Fungicide |
| #12 | Nuocide 404D | 1.03 Kg | | Fungiside |
| #13 | Ammonia Hydroxide | 0.33 Kg | | |

| Item | Component | Kgs | Qty Gal/Lbs | |
|---|---|---|---|---|
| | Premix items #14 and #15 in a clean pail and immediately add to mix. | | | |
| | Premix items #16 and #17 in a clean pail and immediately add to mix. | | | |
| | Mix for 45 minutes | | | |
| #14 | Water | 1.27 Kg | | |
| #15 | Bermocoll 411-FQ | 0.57 Kg | | Builds viscosity-thickener |
| #16 | Water | 1.27 Kg | | |
| #17 | Bermocoll 411-FQ | 1.27 Kg | | Builds viscosity-thickener |
| | Transfer batch to blue mixer. Add items #18 and #19 | | | |
| | Mix 25 minutes, DO NOT MIX FOR LONGER | | | |
| #18 | Rubber Crumb -40 | 55.55 Kg | | Makes it strong and flexible |
| #19 | Sand #0 Dolomite | 111.31 Kg | | Gives it bulk, Fill 22 pails, 110 gallons. |

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A modified acrylic polymer coating prepared by mixing the following components comprising water, 222 Kg; aqueous butyl acrylate-styrene copolymer dispersion, 435 Kg; calcium magnesium carbonate, 136 Kg; granite, 272 Kg; white marble, 136 Kg; calcium sulfate, 1634 Kg; titanium dioxide, 45.36 Kg; polyethylene glycol p-(1,1,3,3-tetramethylbutyl)-phenyl ether, 24 Kg; butoxyethanol, 24 Kg; and mineral spirits, 24 Kg.

2. An acrylic modified polymer base coat obtained by
    mixing 156.53 kilograms of water and 1.03 kilograms of potassium tripolyphosphate at a first speed for 2 minutes to form a first mixture,
    adding 9.87 kilograms of an aqueous butyl acrylate-styrene copolymer dispersion, 59.78 kilograms of a styrene acetate polymer, 1.81 kilograms of ester alcohol and 1.82 kilograms of polyoxyethlene octyl phenyl ether to the first mixture and mixing at the first speed to form a second mixture,
    adding 2.16 kilograms of an aluminum phyllosilicate to the second mixture and mixing for 10 minutes to form a third mixture,
    adding 18.51 kilograms of zirconia/alumin-treated rutile pigment and 55.14 kilograms of dry filler/extender pigment produced from white limestone to the third mixture and mixing at a second speed which is higher that the first speed for 20 minutes to form a fourth mixture,
    slowing the mixing speed to a speed that is higher than the first speed and lower that the second speed,
    adding 0.20 kilograms of mineral oil defoamer, 1.00 kilograms of chlorine dioxide, 1.03 kilograms of tetra chlordisophthalonitrile, and 0.33 kilograms of ammonia hydroxide to the fourth mixture to form a fifth mixture,
    premixing 1.27 kilograms of water and 0.57 kilograms of ethyl hydrocyethyl cellulose to form a first pre-mixture and immediately adding the first pre-mixture to the fifth mixture to form a sixth mixture,
    premixing 1.27 kilograms of water and 1.27 kilograms of ethyl hydrocyethyl cellulose to form a second pre-mixture and immediately adding the second pre-mixture to the sixth mixture to form a seventh mixture,
    mixing the seventh mixture for 45 minutes,
    then transferring the seventh mixture to a separate mixer,
    then adding 55.55 kilograms of rubber crumb made from used tires and 111.31 kilograms of calcium magnesium carbonate to the seventh mixture to form an eighth mixture, and mixing the eighth mixture for 25 minutes.

* * * * *